Sept. 6, 1932.   R. H. DODD ET AL   1,875,996
DIRECTION SIGNAL FOR MOTOR VEHICLES
Filed July 13, 1931   2 Sheets-Sheet 1
Fig. 1
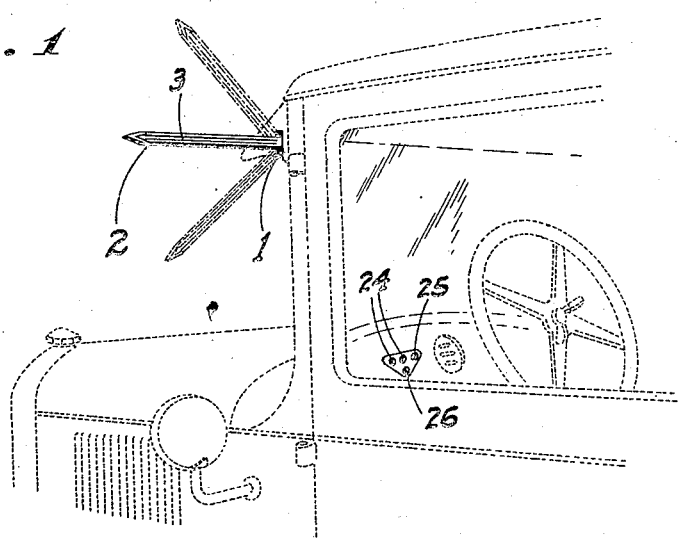
Fig. 5
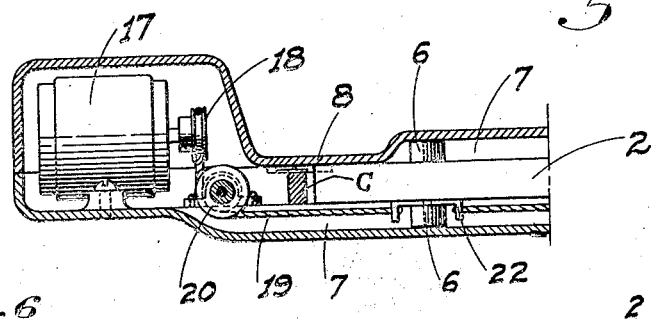
Fig. 6
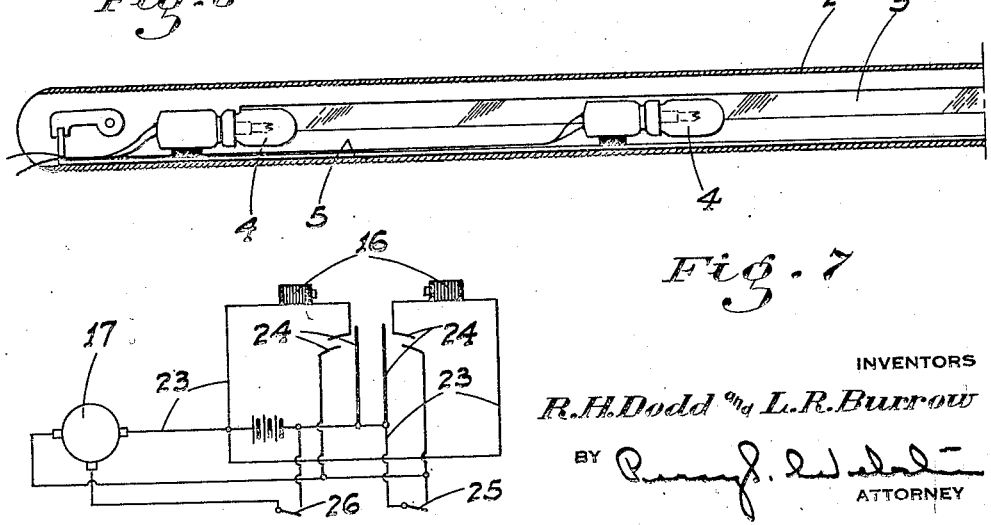
Fig. 7
INVENTORS
R. H. Dodd and L. R. Burrow
BY
ATTORNEY

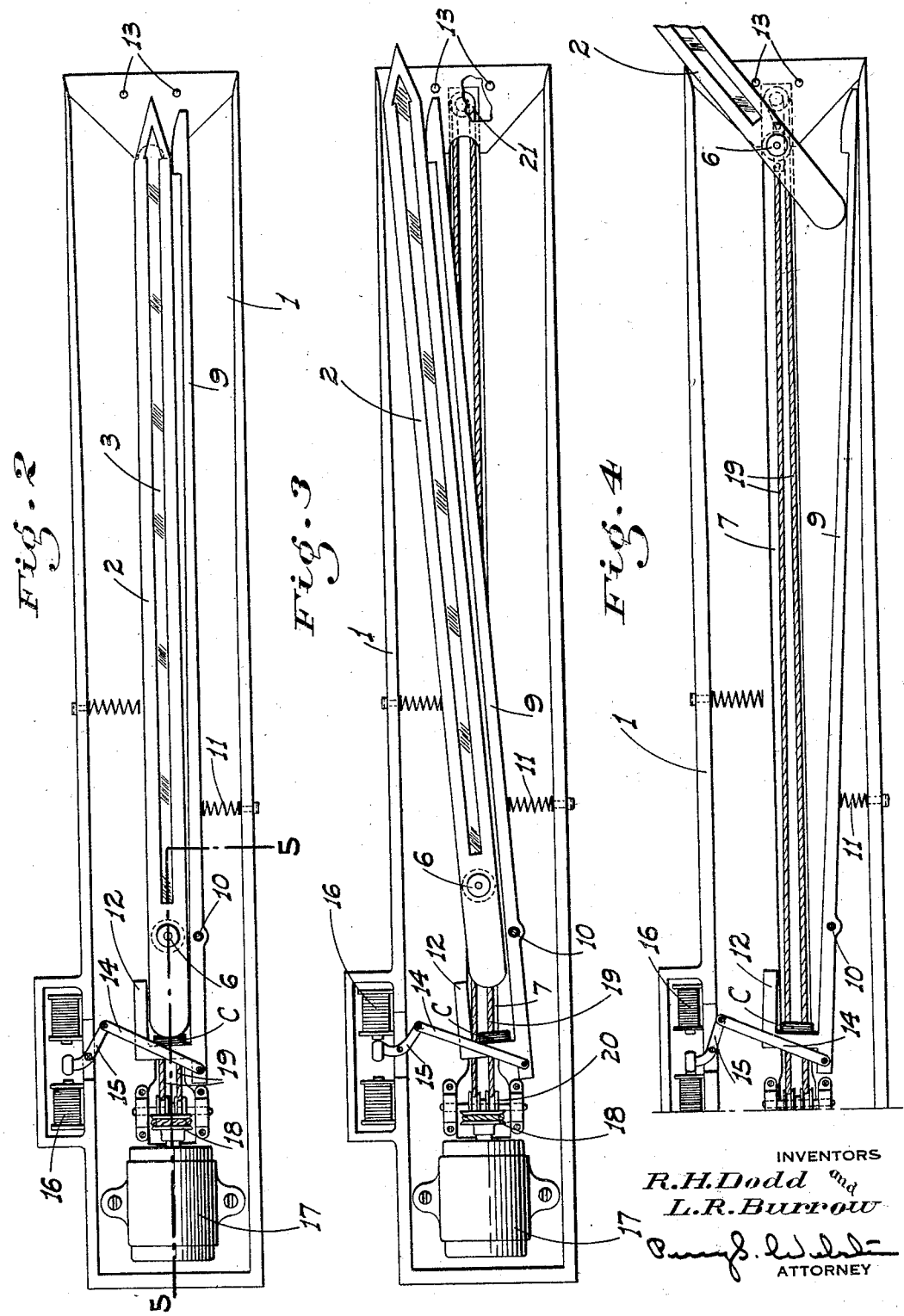

Patented Sept. 6, 1932

1,875,996

UNITED STATES PATENT OFFICE

RICHARD H. DODD AND LEE R. BURROW, OF STOCKTON, CALIFORNIA

DIRECTION SIGNAL FOR MOTOR VEHICLES

Application filed July 13, 1931. Serial No. 550,473.

This invention relates to direction signals for motor vehicles, our principal object being to provide a mechanical electrically operated signal of this character so constructed that the signal arm may project to a considerable distance to one side of the car, so as to be highly visible; and yet when the arm is retracted, nothing then projects from the side of the car to mar its appearance or tend to give a false signal.

Other features of novelty, with respect to the operation and mounting of the signal arm, will be apparent from a perusal of the following specification.

These objects we accomplish by means of such structure and relative arrangement of parts as will fully appear by a perusal of the following specification and claims.

In the drawings similar characters of reference indicate corresponding parts in the several views:

Fig. 1 is a fragmentary perspective outline of a motor vehicle showing our improved signal mounted thereon and as extended to indicate a left-hand turn.

Fig. 2 is a longitudinal view of the signal device, with the cover removed, showing the signal arm retracted to its neutral position.

Fig. 3 is a similar view showing the initial movement of the parts to extend the signal arm to give a right-hand signal.

Fig. 4 is a similar view showing the arm fully extended to said right-hand signal position.

Fig. 5 is a fragmentary longitudinal section of the structure on the line 5—5 of Fig. 2.

Fig. 6 is a similar view of the signal arm.

Fig. 7 is a diagram of the electric circuits for the operating mechanism.

Referring now more particularly to the characters of reference on the drawings, 1 denotes the signal casing—a rectangular member relatively narrow compared to its height and open on one end. This casing is adapted to be mounted transversely on the vehicle in a convenient place, such as under the visor above the windshield, as shown in Fig. 1, and so that its open end faces the left-hand side of the car, but does not project beyond said side.

Mounted in the casing and extending lengthwise thereof is a signal arm 2— a hollow rectangular member preferably pointed on its outer end to represent an arrow. The arm has a window 3 along the same, and carries inside a number of electric lights 4. These lights are preferably mounted in insulated relation on a strip 5 which is slidable in the arm from its inner end, so that the lights can be withdrawn as a unit for replacement whenever necessary.

Close to its inner end the signal arm on its front and back carries alined rollers 6 which ride in longitudinal grooves 7 provided in the casing and its cover 8. Mounted in the casing under the signal arm is a rocking arm 9. This arm extends from end to end of the signal arm and is pivoted near its inner end in the casing as shown at 10, and is held in a normally horizontal position by a spring 11. At its inner end the arm 9 has an upward extension 12 to overhang the adjacent end of the signal.

At the forward open end of the casing is mounted a pair of transversely extending pins 13. These pins are located symmetrically relative to the slots 7 and are spaced apart sufficiently to enable the signal to either pass therebetween, or above or below the same. A vertically extending link 14 is connected at one end to the rocking arm at its rear end, the outer end of the link being connected to the lower end of a bellcrank 15 pivoted on the casing. The upper end of the bellcrank is disposed between opposed electromagnets 16 secured on the casing. The bellcrank and magnets are arranged relatively to the arm 9 so that when one of the magnets is energized, the bellcrank will be pulled in one direction and the arm 9 and consequently the signal will be raised; and when the other magnet is energized the bellcrank will be pulled in the other direction, the arm 9 will be lowered, and the signal is then free to drop to a corresponding slope of its own weight.

To move the signal lengthwise of the casing from any position to which it may be initially set by the functioning of the magnets, we provide a reversible electric motor 17 mounted in the casing back of the signal and rocking arms. This motor carries a sheave 18 engaging a cable 19 which passes thence over horizontal direction changing pulleys 20 and along the casing slot under the signal to and about a vertically disposed pulley 21 mounted at the outer end of the slot 7.

One run of the cable intermediate its ends is connected to the signal adjacent and on opposite sides of the corresponding roller 6 by a swivel plate 22, as shown in Fig. 6. By means of this arrangement it will be seen that with the operation of the motor in one direction or the other the signal will be moved one way or the other along the casing.

In connection with the motor and electromagnets, we have provided a circuit arrangement including a battery of switches mounted on the dash board of the car or other convenient location. This arrangement comprises separate circuits 23 between the motor and the magnets with a manually operated switch 24 in each circuit. Each switch is arranged so as to energize the corresponding magnet before the motor circuit is closed, and to hold the magnet energized only for a short time thereafter. Another switch 25 interposed in one of the circuits 23 permits the motor to be operated without energizing the magnet. The reversing circuit for the motor has another switch 26 therein.

In operation, when it is desired to give a left-hand signal for instance, the switch 25 is closed and held closed. This operates the motor without energizing the magnets so that the signal will then be projected outwardly between the pins 13 by the movement of the cable 19, and as it thus projects, it will be supported by the lower pin 13.

If it is desired to give a right-hand signal, in which case the signal must of course be at an upward angle, the corresponding switch 23 must be closed. This first energizes the corresponding magnet pulling the arm 9 upwardly so that the outer end of the signal is above the level of the upper pin 13. When the motor is then operated the signal is advanced somewhat before the magnet is de-energized, which allows the arm 9 to drop to its normally horizontal position. The signal is then supported by the upper pin 13 so that it is maintained at a slope, which is gradually increased with the outward movement on the signal. As the rollers 6 (about which the signal may turn) approach the outer end of the slots as shown in Fig. 4, the angle or slope of the signal is increased, and the switch is then released and the signal will remain set. When it is desired to retract the signal from any extended position, it is only necessary to close the switch 26 which reverses the direction of rotation of the motor and the cable is pulled in the opposite direction to retract the signal. To keep the signal when being retracted from any harsh shock or jar, the rear end of the arm 9 is provided with a resilient cushion C against which the signal may bump when it reaches its full retracted position.

From the foregoing description it will be readily seen that we have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described our invention what we claim as new and useful and desire to secure by Letters Patent is:

1. A direction signal comprising a horizontal casing, a signal arm extending lengthwise of and normally disposed within the casing, means to extend the arm from the casing, means to initially shift the arm to horizontal, upwardly or downwardly angled positions relative to the casing, and selective means for each position to successively place the position controlling means and subsequently the extending means in operation.

2. A direction signal comprising a horizontal casing, a signal arm extending lengthwise of and normally disposed within the casing, means to extend the arm from the casing, means to selectively and initially position said arm with an upward or downward slope while still in the casing, and means to cause the angle of slope of the arm to be increased as said arm is extended.

3. A direction signal comprising a casing open on one end, a signal arm extending lengthwise of and normally disposed within the casing, means supporting the arm at a point intermediate its ends within the casing for longitudinal and swivel movement about said point, selectively controlled means to tilt the arm while in the casing up or down about said point or to maintain the same horizontally and means to extend the arm after it has been thus set.

4. A structure as in claim 1, with means to maintain the arm in its set position, after the extending means is in operation and the operation of the setting means has been discontinued.

5. A structure as in claim 3, with vertically spaced members extending transversely of the casing adjacent its outer end; said members being disposed symmetrically relative to the horizontal position of the signal; the vertical spacing between the members and between the top and bottom of the casing and the adjacent members being greater than the height of the signal arm.

6. A direction signal comprising a horizontal casing open at one end and having a longitudinal groove in one vertical side, a signal member extending lengthwise of and normally disposed in the casing, a roller on the member intermediate its ends riding in the groove, means applied to the member adjacent the roller to move the same lengthwise of the casing whereby to extend the signal from the open end of the casing, a tiltable arm engaging the signal beyond the roller to normally support the member in a horizontal position, and means to tilt the arm up or down to similarly tilt the signal member, and selective control means for said arm tilting means and the signal extending means to cause the two to function in successive sequence.

7. A direction signal comprising a horizontal casing open at one end and having a longitudinal groove in one vertical side, a signal member extending lengthwise of and normally disposed in the casing, a roller on the member intermediate its ends riding in the groove an endless cable extending lengthwise of and in the groove and to one run of which the signal member is connected at the roller, a motor in the casing and connected to the cable to drive the same, a tiltable arm engaging the signal beyond the roller to normally support the signal in a horizontal position, a pair of separate electromagnets, means between said magnets and the arm to tilt the latter up or down with the energizing of one magnet or the other, and means to selectively control the functioning of either magnet and the motor in successive order.

In testimony whereof we affix our signatures.

RICHARD H. DODD.
LEE R. BURROW.